INVENTOR.
ELMER L. CASKEY
BY

Dec. 2, 1969         E. L. CASKEY         3,481,226
TOOL FOR RELIEVING AIR ENTRAPMENTS
Filed Aug. 14, 1967                    2 Sheets-Sheet 2
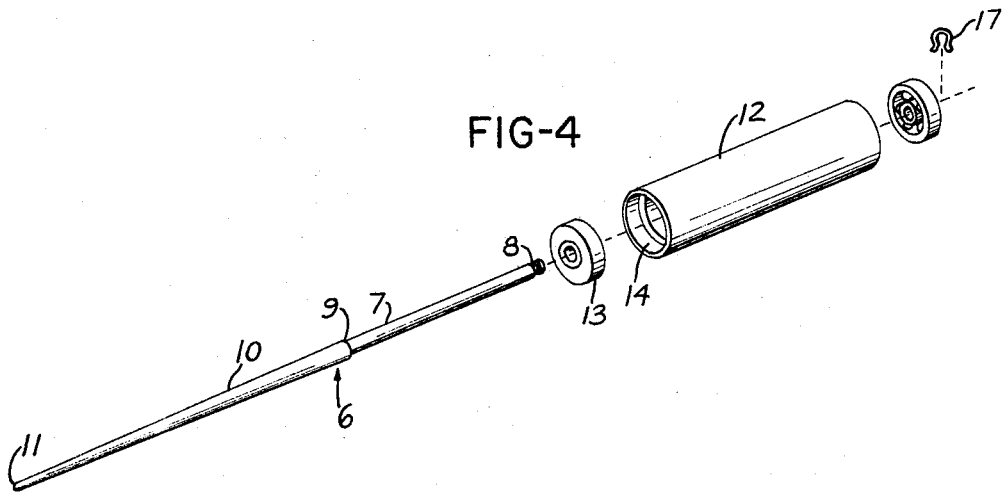
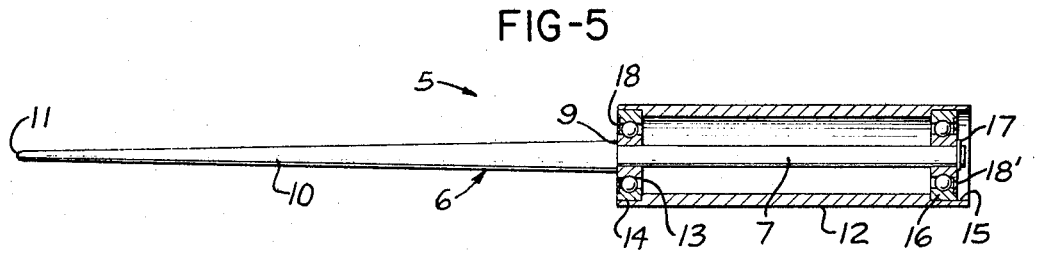
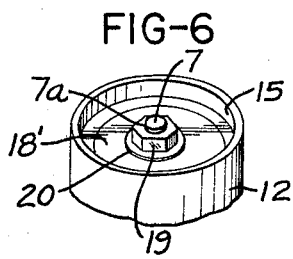 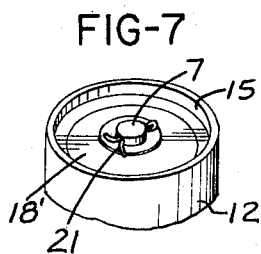 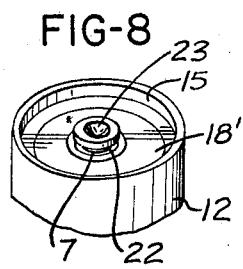
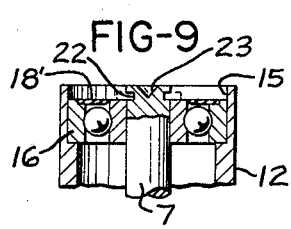 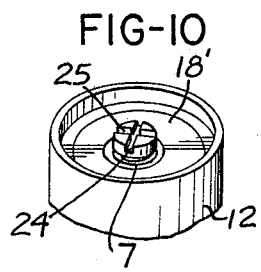
INVENTOR.
ELMER L. CASKEY
BY United States Patent Office 3,481,226
Patented Dec. 2, 1969

3,481,226
TOOL FOR RELIEVING AIR ENTRAPMENTS
Elmer L. Caskey, Dayton, Ohio, assignor to Trojan Manufacturing Company, Inc., Troy, Ohio
Filed Aug. 14, 1967, Ser. No. 660,390
Int. Cl. B25b 27/00
U.S. Cl. 81—3                                      6 Claims

ABSTRACT OF THE DISCLOSURE

An air relieving tool, especially for use in connection with the building up of pneumatic tires, for relieving air entrapments between the tread strip and the adjacent ply. The tool is characterized by a handle and a shaft rotatably supported by said handle so as to be rotatable relative thereto while said shaft has a relatively long and thin tapered portion located outside said handle and tapering in a direction away from said handle.

---

The present invention relates to the building up of pneumatic tires and, more specifically, concerns a tool for relieving air entrapments encountered in connection with the building up of pneumatic tires.

It is well known to build up tires on a radially expandable and contractable tire building drum by depositing the desired number of layers or plies on and around the drum and subsequently placing the tread strip on top of and around the outermost ply. It is also known that during the depositing of the relatively thick tread strip upon the adjacent ply it is unavoidable that air is entrapped between the tread strip and the adjacent ply. This air which is generally in the form of small individual bubbles has to be removed from the raw tire on the drum in order to prevent a faulty tire construction and the danger that, with the finished tire in operation, the tread strip accidentally detaches itself from the remainder of the tire.

It has, therefore, been the common practice in the tire building art, following the deposit of the tread strip on the outermost ply, to introduce two flat blades or knives from opposite sides deep between the tread strip and the adjacent ply and, while the drum is rotating, gradually to withdraw said blades or knives in opposite and axial direction of the drum to thereby allow the air entraped between the tread strip and the adjacent ply to escape into the atmosphere. This practice, however, has not proved satisfactory for the following reason. Unless considerable strength is exercised in holding the blade or knife still in spite of the frictional engagement of the rotating tread strip and ply or plies on the drum, the blades or knives will jerk back and forth, and it is unavoidable that they will cut into either one or both, the adjacent ply and the tread strip. Also when the blade or knife is not held in a certain position, but more or less inclined, a cutting of the blade into the tire components cannot be avoided.

It is, therefore, an object of the present invention to provide a tool which will replace the above mentioned heretofore employed de-airing blades or knives while avoiding the drawbacks thereof.

It is another object of this invention to provide a tool for relieving air entraped between the tread strip and the adjacent tire ply during the building up of the tire which will be easy to handle and which can easily be held at the desired places.

These and other objects and advantages of the invention will appear more clearly from the following specification in connection with the accompanying drawings, in which:

FIG. 4 represents an exploded view of a tool according to the present invention.

FIG. 5 is a longitudinal section through the tool.

FIGS. 6 to 8 illustrate different ways of locking the ball bearings to the air relieving shaft of the tool.

FIGS. 9 to 10 respectively illustrate in section and in perspective end view still another way of assembling and locking the outer ball bearing to the outer end of the air relieving shaft.

The tool according to the present invention is characterized primarily by a relatively long and thin shaft which tapers from a handle portion in which the tool is rotatably journalled to almost a point so that the air relieving shaft can easily be introduced between the tread strip and the adjacent ply on the tire building drum. Inasmuch as this shaft is rotatably journalled by means of ball bearings in a handle, it can easily rotate between the tread strip and the adjacent tire ply on the tire building drum so that the frictional engagement between the tread strip and the air relieving shaft on one hand and the latter and the adjacent ply will rotate the air relieving shaft without subjecting the tool to any jerky movements.

Figure 1:
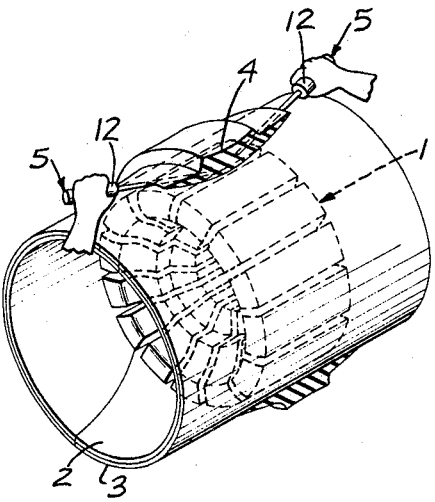
FIG. 1 is a perspective view of a tire building drum with tire plies and tread strip thereon, the latter being partially shown in section, while the air relieving tools according to the invention are held in their operative position.
Figure 2:
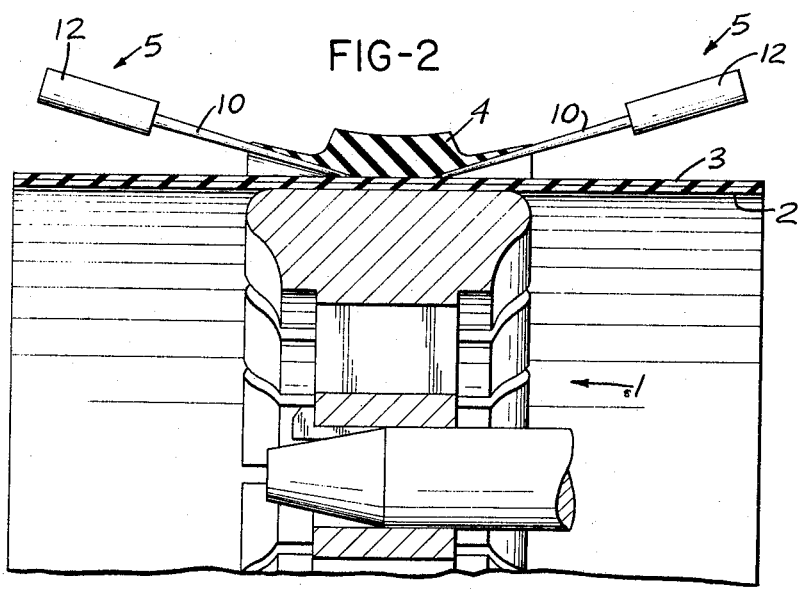
FIG. 2 illustrates on a larger scale than FIG. 1 a section through the tire building drum with the plies and tread strip thereon and the tools in their approximate starting position.
Figure 3:
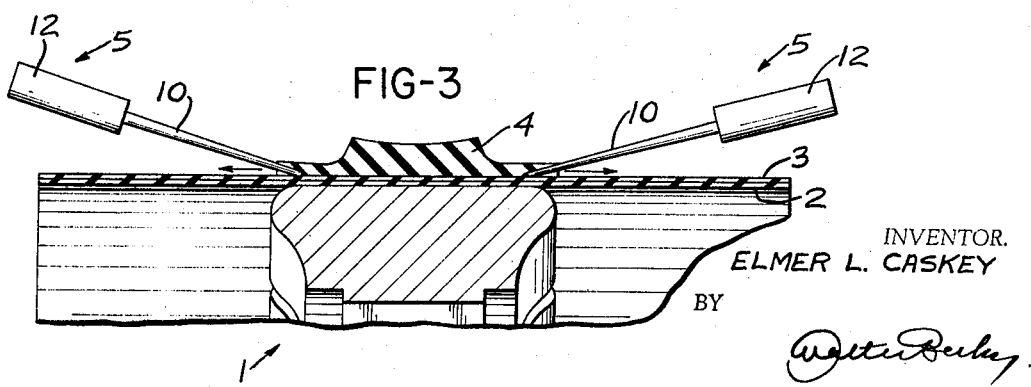
FIG. 3 shows the upper portion of FIG. 2 but with the tools almost withdrawn from between the tread strip and the adjacent ply.

Referring now to the drawings in detail and FIG. 1 thereof in particular, this figure shows a customary rotatable segmental tire building drum generally designated 1 which has placed thereon two carcass layers or plies 2, 3 which extend all the way around the drum 1. Furthermore, a tread strip 4 is placed on and extends around the central area of the outermost ply 3. After the tread strip 4 has thus been placed upon the layer or ply 3, it is necessary to remove the air which during the deposit of the tread strip onto ply 3 has unavoidably become entrapped between said tread strip and ply 3. To this end, the air relieving tools according to the present invention, which are generally designated with the reference numeral 5, are introduced from opposite sides between tread strip 4 and ply 3 as particularly clearly shown in FIG. 2. Thereupon, while the drum 1 is being rotated in any convenient manner, the tools 5 are in opposite direction gradually withdrawn from between tread strip 4 and ply 3 as shown in FIG. 3.

Referring now more in detail to the tool 5 itself, an exploded view of the tool is shown in FIG. 4. As will be seen therefrom, the tool 5 comprises a shaft 6 which has a cylindrical portion 7 with a snap ring groove 8 at one end and with a radially outwardly extending step 9. From the outer periphery of step 9 the shaft 6 continues as a slender tapered portion 10 ending in a rounded point 11 for an easy introduction between the tread strip 4 and the adjacent ply 3.

The tool according to the invention furthermore comprises a handle 12 in the form of a tubular piece, preferably cut from tubular aluminum stock. The inside of said handle 12 at one end thereof has a first turned out portion 14 in which is slip-fitted an antifriction bearing 13. Similarly, the other end of the handle is at the inside thereof provided with a turned out portion 15 in which is slip-fitted a second antifriction bearing 16. As will be seen from FIG. 5, the cylindrical shaft portion 7 extends through and is slip-fitted in the inner race ring of said antifriction bearings 13, 16 in such a way that the step or shoulder 9 engages the inner race ring of antifriction bearing 13, whereas the free end of shaft portion 7 extends outwardly and slightly beyond antifriction bearing 16 so that the inner edge of snap ring groove 8 is substantially flush with the outer end face of the inner race ring of antifriction bearing 16. Groove 8 receives a snap ring 17 whereby shaft portion 7 is firmly held within the inner race rings of antifriction bearings 13 and 16, while said antifriction bearings 13 and 16 are firmly held within the handle 12. Consequently, the tapered tool shaft portion 10 is firmly rotatably supported by handle 12.

In order to prevent dust or dirt from entering the antifriction bearings and the interior of the handle 12, the outside of said bearings 13, 16 is closed by dust seals 18, 18' respectively. Preferably, as shown in FIG. 5, the turned out portion 15 is somewhat longer than the width of the bearing 16 so that also the free end of shaft portion 7 with the respective connecting means thereon will be located within the handle 12.

While FIGS. 4 and 5 show one possibility of securing bearings 13, 16 in handle 12 and of securing shaft portion 7 within said bearings, numerous other arrangements are possible for this purpose, and a few of said preferred other possibilities are set forth in FIGS. 6 to 10.

According to FIG. 6, the outer end of shaft portion 7 is provided with a thread 7a for receiving a locking nut 19 after a washer 20 has been slipped over the said threaded end.

According to FIG. 7, the threaded end portion of shaft portion 7 and the nut 19 have been replaced by a cotter pin 21 extending through a corresponding transverse bore at the end of shaft portion 7.

According to the modification of FIGS. 8 and 9, the outer end of shaft portion 7 has a groove 22 similar to groove 8 and has its outer free end provided with a conical recess 23 which after the assembly of the parts has been completed, is peened over as indicated in dash lines in FIG. 9.

Finally, the embodiment of FIG. 10 fully corresponds to that of FIGS. 8 and 9 with the exception that instead of the recess 23 in the outer free end of shaft portion 7 there is provided a double slot or screw driver slot 24, 25.

It is, of course, to be understood that the present invention is, by no means, limited to the particular constructions and embodiments illustrated in the drawings but also comprises any modifications within the scope of the appended claims. Thus, while the taper of the tapered shaft portion 7 may be so selected as to allow an easy and convenient insertion and withdrawal of the tool between the tread strip and the adjacent ply, generally a taper within the limits of from 2°30' to 3° has proved highly successful. Also the length of the tapered shaft portion protruding from the handle may vary in conformity with the width of the tire to be produced. Merely as an example, a length of said tapered shaft portion of 6¼" will generally be satisfactory for the average automobile tire.

What I claim is:
1. An air relieving tool, especially for use in connection with the building up of pneumatic tires, which includes: a handle, and a shaft rotatably supported by said handle so as to be rotatable relative thereto, said shaft having a relatively long and thin tapered portion located outside said handle and tapering in a direction away from said handle.

2. A tool according to claim 1, which includes: a tubular member forming said handle, two antifriction bearing means with outer race ring and inner race ring arranged within said tubular member, said bearing means being spaced from each other in the axial direction of said tubular member, the inner race rings of said bearing means engaging a portion of said shaft so that the latter turns together with said inner race rings, and means for securing said bearings means and said shaft against displacement in axial direction of the relative to said tubular member.

3. A tool according to claim 2, in which said tapered portion of said shaft has adjacent its maximum diameter portion a cylindrical portion supported by said inner race rings, said cylindrical shaft portion having a diameter less than the maximum diameter of said tapered portion so that a step with a radial surface perpendicular to the axis of said shaft is formed where said tapered portion meets said cylindrical shaft portion, said radial surface being engaged by the adjacent end face of that one of said bearing means which is closest to said tapered shaft portion.

4. A tool according to claim 2, in which said tubular member has adjacent its end portions and on the inside thereof annular recess means including abutment walls for respectively receiving and abutting said antifriction bearing means, and in which that one shaft end which is opposite the minimum diameter end of said tapered shaft portion is provided with means for holding said bearings means in abutment with said abutment walls, said last mentioned means in cooperation with said abutment walls forming said means for securing said bearing means and said shaft against displacement in axial direction of and relative to said tubular member.

5. A tool according to claim 1, in which said tapered shaft poriton has a taper of from 2°30' to 3°.

6. A tool according to claim 1, in which said tapered shaft portion tapers to a rounded point.

References Cited
UNITED STATES PATENTS 2,849,879  9/1958  Schiller _____ 81—3

ROBERT C. RIORDON, Primary Examiner

R. V. PARKER, Assistant Examiner

U.S. Cl. X.R.

156—87, 394